United States Patent Office 3,287,380
Patented Nov. 22, 1966

3,287,380
14-HYDROXY STEROIDS
Takuichi Miki, Amagasaki, and Kentaro Hiraga, Ikeda, Japan, assignors to Takeda Chemical Industries, Ltd., Higashi-ku, Osaka, Japan
No Drawing. Filed Oct. 28, 1964, Ser. No. 407,249
Claims priority, application Japan, Nov. 1, 1963, 38/59,007
11 Claims. (Cl. 260—397.45)

The present application is a continuation-in-part of copending application, Ser. No. 316,142, filed October 14, 1963.

The present invention relates to novel and useful 14-hydroxy steroids, and more particularly to 13-substituted 14-hydroxygona-1,3,5(10),9-tetraen-17-ones which are novel and useful as medicaments having diuretic or anti-cholesteremic activity, or as intermediates for producing estradiol or its related compounds.

It is an object of the present invention to embody the aforesaid 13-substituted 14-hydroxygona-1,3,5(10),9-tetraen-17-ones.

Another object of this invention is to provide a method for preparing the aforesaid novel and useful 13-substituted 14-hydroxygonapolyen-17-ones.

For the purpose of realizing the said objects, intramolecular cyclization of 13-substituted 8,14-secogona-1,3,5(10),9-tetraene-14,17-diones, as starting materials, is effected under mild conditions. These starting materials are compounds having a structure represented by the Formula I:

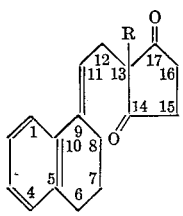

(I)

wherein R is a hydrocarbon residue, which is exemplified by a lower alkyl having up to 4 carbon atoms (e.g., methyl, ethyl, n-propyl, isopropyl, n-butyl and isobutyl), phenyl and benzyl. The compounds (I) may have one or more substituents, at one or more of positions 1, 2, 3, 4, 6, 7, 15 and 16 in the steroid skeleton, for example, hydrocarbon residue such as a lower alkyl having up to 4 carbon atoms (e.g., methyl, ethyl, n-propyl, isopropyl, n-butyl or isobutyl), phenyl and benzyl, etherified hydroxy group (e.g., methoxy, ethoxy, n-propoxy or n-butoxy), esterified hydroxy group (e.g., acetoxy, propionyloxy or benzoyloxy), a halogen (e.g., fluorine or chlorine) or a thio group (e.g., mercapto, methylthio, ethylthio or acetylthio).

These starting materials (I) are obtained by the condensation reaction of 1-hydroxy-1-vinyltetraline (II) with 2-substituted cyclopentane-1,3-diones (III) in the presence of a basic catalyst. The reaction is depicted by the following equation:

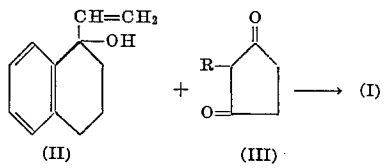

wherein R has the same significances as defined in connection with Formula I, and the compound represented by (III) may have one or more of the substituents enumerated supra in connection with compound (I).

Among compounds representable by (III) above, especially preferable for this invention are, for example:
15-propyl-8,14-secoestra-1,3,5(10),9-tetraene-14,17-dione;
16-methyl-8,14-secoestra-1,3,5(10),9-tetraene-14,17-dione;
1-methyl-3-methoxy-13-ethyl-8,14-secogona-1,3,5(10),9-tetraene-14,17-dione;
8,14-secoestra-1,3,5(10),9-tetraene-14,17-dione;
3-methoxy-8,14-secoestra-1,3,5(10),9-tetraene-14,17-dione;
3-ethoxy-8,14-secoestra-1,3,5(10),9-tetraene-14,17-dione;
13-ethyl-8,14-secogona-1,3,5(10),9-tetraene-14,17-dione;
13-isopropyl-8,14-secogona-1,3,5(10),9-tetraene-14,17-dione;
13-benzyl-8,14-secogona-1,3,5(10),9-tetraene-14,17-dione;
13-phenyl-8,14-secogona-1,3,5(10),9-tetraene-14,17-dione;
3-methoxy-12-ethyl-8,14-secogona-1,3,5(10),9-tetraene-14,17-dione;
3-methoxy-13-n-propyl-8,14-secogona-1,3,5(10),9-tetraene-14,17-dione;
3-methoxy-13-isopropyl-8,14-secogona-1,3,5(10),9-tetraene-14,17-dione;
3-methoxy-13-phenyl-8,14-secogona-1,3,5(10),9-tetraene-14,17-dione;
3-methoxy-13-benzyl-8,14-secogona-1,3,5(10),9-tetraene-14,17-dione;
3-methoxy-6-methyl-13-ethyl-8,14-secogona-1,3,5(10),9-tetraene-14,17-dione; etc.

In the present invention, the starting compound (I) is allowed to condense intramolecularly under mild conditions, e.g., in the presence of catalyst and at a rather low temperature, whereupon the C-ring of the steroid skeleton is formed. The reaction is accelerated by the use of an absorbent catalyst, e.g., silica gel, alumina or silica-alumina, or an acid catalyst exemplified by inorganic or organic acids or their anhydrides such as hydrochloric acid, sulfuric acid, p-toluenesulfonic acid, boron trifluoride or cation exchange resins.

The reaction can be effected more smoothly by the use of a suitable solvent such as benzene, toluene, xylene, tetrahydrofuran, dibutyl ether, methanol, ethanol, propanol, dioxane, ether, petroleum ether or chloroform.

The reaction is usually carried out at room temperature (about 15° to about 30° C.) or with cooling, and if necessary the reaction may be allowed to take place with mild heating at a temperature lower than 80° C., desirably lower than 40° C. Under more drastic conditions, e.g., at a high-temperature, especially in the presence of an acid catalyst, 13-substituted gona-1,3,5(10),8,14-pentaen-17-ones are obtained as by-products with objective compounds. These by-products as well as other impurities may be removed easily by a known method for separation of steroids, e.g., separation utilizing a difference among the objective compounds, the by-products and other impurities in their solubilities in various solvents or in their adsorbabilities on an absorbent such as active charcoal or ion-exchange resin.

The resulting 13-substituted-14-hydroxygona-1,3,5(10),9-tetraen-17-ones (IV) have the structure shown by the formula:

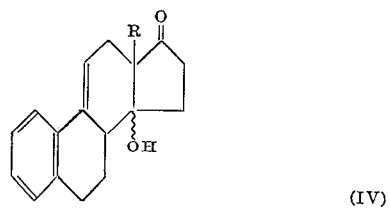

(IV)

wherein R is a hydrocarbon residue, which is exemplified by a lower alkyl having up to 4 carbon atoms (e.g., methyl, ethyl, n-propyl, isopropyl, n-butyl or isobutyl), phenyl and benzyl, and may have as substituent or substituents, for example, at one or more of positions 1, 2, 3, 4, 6, 7, 15 and 16 in the steroid skeleton, hydrocarbon residue such as a lower alkyl having up to 4 carbon atoms (e.g., methyl, ethyl, n-propyl, isopropyl, n-butyl or isobutyl), phenyl and benzyl, etherified hydroxy group (e.g., methoxy,, ethoxy, n-propoxy or n-butoxy), esterified hydroxy group (e.g., acetoxy, propionyloxy or benzoyloxy), a halogen (e.g., fluorine or chlorine), or a thio group (e.g., mercapto, methylthio, ethylthio or acetylthio). Among the compounds (IV), those preferable for the purpose of the present invention have an etherified hydroxy group at position 3, and they include, for example:

14-hydroxy-15-ethylestra-1,3,5(10),9-tetraen-17-one;
3-methoxy-14-hydroxy-16-methylestra-1,3,5(10),9-tetraen-17-one;
1-methyl-3-methoxy-14-hydroxyestra-1,3,5(10),9-tetraen-17-one;
3-methoxy-14-hydroxyestra-1,3,5(10),9-tetraen-17-one;
3-ethoxy-14-hydroxyestra-1,3,5(10),9-tetraen-17-one;
13-ethyl-14-hydroxygona-1,3,5(10),9-tetraen-17-one;
13-isopropyl-14-hydroxygona-1,3,5(10),9-tetraen-17-one;
13-benzyl-14-hydroxygona-1,3,5(10),9-tetraen-17-one;
13-phenyl-14-hydroxygona-1,3,5(10),9-tetraen-17-one;
3-methoxy-13-ethyl-14-hydroxygona-1,3,5(10),9-tetraen-17-one;
3-methoxy-13-n-propyl-14-hydroxygona-1,3,5(10),9-tetraen-17-one;
3-methoxy-13-isopropyl-14-hydroxygona-1,3,5(10),9-tetraen-17-one;
3-methoxy-13-phenyl-14-hydroxygona-1,3,5(10),9-tetraen-17-one;
3-methoxy-13-benzyl-14-hydroxygona-1,3,5(10),9-tetraen-17-one;
3-methoxy-6-methyl-13-ethyl-14-hydroxygona-1,3,5(10),9-tetraen-17-one; etc.

It is to be understood that the following examples of presently preferred embodiments of the invention are solely for the purpose of illustration and are not to be construed as limitations of this invention, and that many variations may be resorted to without departing from the spirit and scope of this invention. In the examples, "m$\mu$" and "cm$^{-1}$" are "millimicrons" and wave number "per centimeter," respectively, and temperatures are all uncorrected.

Example 1

In 4 cubic centimeters of tetrahydrofuran is dissolved 0.5 gram of 3-methoxy-8,14-secoestra-1,3,5(10),9-tetraene-14,17-dione, followed by the addition of 1 cubic centimeter of 2-normal hydrochloric acid. The mixture is allowed to stand at room temperature for 24 hours. To the reaction mixture are added benzene and an aqueous sodium hydrogen carbonate solution, and the resulting mixture is shaken to separate a benzene layer. The benzene solution is washed with water and concentrated to leave an oily residue, which is chromatographed on alumina to obtain 0.2 gram of ($\pm$)3-methoxyestra-1,3,5(10), 8,14-pentaen-17-one and 0.1 gram of 14-$\epsilon$-hydroxy-3-methoxyestra-1,3,5(10),9-tetraen-17-one.

The latter product is a mixture of two diastereisomers, one melting at 161° C. and the other melting at 129° C., which are separable from each other by further chromatography on alumina. The crystals melting at 129° C. show the following properties:

Ultraviolet absorption:

$$\lambda_{max.}^{EtOH}\ 267\ m\mu$$

Elementary analysis: Calculated for $C_{19}H_{22}O_3$: C, 76.48; H, 7.43. Found: C, 76.53; H, 7.33.

The mixture of 14$\epsilon$-hydroxy-3-methoxyestra-1,3,5(10), 9-tetraen-17-ones is treated with 2-normal hydrochloric acid in methanol to give ($\pm$)3-methoxyestra-1,3,5(10), 8,14-pentaen-17-one.

Example 2

5 grams of 3 - methoxy - 13 - ethyl - 8,14 - secogona-1,3,5(10),9-tetraene-14,17-dione is dissolved in an equivolume mixture of benzene and ethyl acetate, and the solution is allowed to flow through a column packed with silica gel. The effluent is concentrated to give 2.5 grams of 14$\epsilon$-hydroxy - 3 - methoxy-13-ethylgona-1,3,5(10),9-tetraen-17-one as colorless needles showing the following properties:

Melting point: 152° C.
Ultraviolet absorption:

$$\lambda_{max.}^{EtOH}\ 263\ m\mu\,(\epsilon=18{,}300)$$

Nuclear magnetic resonance:

$$\tau_{11-H}4.05$$

Elementary analysis: Calculated for $C_{20}H_{24}O_3$: C, 76.39; H, 7.74. Found: C, 76.73; H, 7.61.

This product is further treated with 2-normal hydrochloric acid in methanol to obtain ($\pm$)3-methoxy-13-ethylgona-1,3,5(10),8,14-pentaen-17-one.

Example 3

3 grams of 8,14-secoestra-1,3,5(10),9-tetraen-14,17-dione is dissolved in benzene, and the solution is allowed to flow through a column packed with 100 grams of silica gel. After thorough washing with benzene, the column is eluted with a mixture of benzene and ether (5:1 by volume). The eluate is concentrated to give 1 gram of 14$\epsilon$-hydroxy-estra-1,3,5(10),9-tetraen-17-one as crystals showing:

Melting point: 140° C.
Ultraviolet absorption:

$$\lambda_{max.}^{EtOH}\ 252\ m\mu\,(\epsilon=13{,}100)$$

Elementary analysis: Calculated for $C_{19}H_{22}O_2$: C, 80.59, H, 7.46. Found: C, 80.62, H, 7.52.

Example 4

A mixture of 40 grams of 6-methoxy-1-vinyltetralol, 25 grams of 2-ethylcyclopentane-1,3-dione and 300 cubic centimeters of xylene is boiled for 3 hours while stirring. The reaction mixture is concentrated to about 1/3 volume to give crystals of unchanged 2-ethylcyclopentane-1,3-dione, and the separated crystals (10 grams) are removed by filtration. The filtrate is further concentrated to leave 10 grams of 3-methoxy-13-ethyl-8,14-secogona-1,3,5(10),9-tetraene-14,17-dione.

A solution of 10 grams of 3-methoxy-13-ethyl-8,14-secogona-1,3,5(10),9-tetraene-14,17-dione in 150 cubic centimeters of equivolume mixture of benzene and ethyl acetate is allowed to flow through a column packed with 200 grams of silica gel, whereby the steroid is adsorbed on the silica gel. The column is allowed to stand for five days, and is eluted with ethyl acetate to discharge the steroidal substance. The solvent of the eluate is evaporated under reduced pressure. To the residue is added ether to give, as crystals which are collected by filtration, 8 grams of 3-methoxy-14$\epsilon$-hydroxy-13-ethylgona-1,3,5 (10),9-tetraen-17-one melting at 152° C.

The crystals are treated with hydrochloric acid in methanol to obtain ($\pm$)3-methoxy-13-ethylgona-1,3,5 (10),8,14-pentaen-17-one.

Example 5

A solution of 1 gram of 3-methoxy-8,14-secoestra-1,3, 5(10),9-tetraene-14,17-dione in 10 cubic centimeters of benzene is allowed to flow through a column packed with 20 grams of silica gel, whereby the steroid is adsorbed on the silica gel. The column is allowed to stand for 10 hours, and is eluted with mixture of benzene and ether (5:1 by volume) to discharge the steroidal substance. (±)3-methoxyestra-1,3,5(10),8,12-pentaen-17-one is obtained by concentration of the first eluate (melting point: 108° C.). (±)14 - hydroxy-3-methoxyestra-1,3,5(10),9-tetraen-17-one is then eluted, 0.6 gram being obtained showing melting point of 162° C.

Thus-obtained (±)14ε - hydroxy-3-methoxyestra-1,3,5(10),9-tetraen-17-one is converted to (±)3-methoxyestra-1,3,5(10),8,14-tetraen-17-one melting at 108° C. by treatment with acidic catalyst. So-obtained (±)3-methoxyestra-1,3,5(10),8,14-tetraen-17-one is treated with sodium borohydride in methanol at −10° C. to obtain (±)3 - methoxyestra-1,3,5(10),8,14-pentaen-17β-ol melting at 113° C., which is selectively reduced with the aid of Raney nickel to (±)3 - methoxyestra - 1,3,5(10),8-tetraen-17β-ol melting at 126° C. This compound is further reduced with potassium in liquid ammonia to (±)3 - methoxyestra-1,3,5(10)-trien-17β-ol melting at 130° C.

*Example 6*

A mixture of 1 gram of 3-methoxy-13-isopropyl 8,14-secogona-1,3,5(10),9-tetraene-14,17-dione, 20 grams of silica gel and 30 cubic centimeters of benzene is allowed to stand for ten days, and is then filtered. The silica gel is washed with ethyl acetate. The washings are combined with the benzene filtrate and concentrated to give 3-methoxy - 14ε - hydroxy-13-isopropylgona-1,3,5(10),9-tetraen-17-one as crystals melting at 136° C.

Ultraviolet absorption:

$$\lambda_{max.}^{EtOH}\ 265\ m\mu(\epsilon=17{,}900)$$

Infrared absorption:

$$\gamma_{max.}^{Nujol}\ 3480\ cm.^{-1}$$
$$1723\ cm.^{-1}$$

Elementary analysis: Calculated for $C_{21}H_{26}O_3$: C, 77.30, H, 7.95. Found: C, 76.88, H, 7.86.

The crystals are treated with hydrochloric acid in methanol to obtain 3 - methoxy-13-isopropylgona-1,3,5(10),8,14-pentaen-17-one.

Having thus disclosed the invention, what is claimed is:

1. 13-substituted 14 - hydroxygona-1,3,5(10),9-tetraen-17-one, wherein the 13-substituent is selected from the group consisting of alkyl of 1 to 4 carbon atoms, phenyl and benzyl.

2. A compound of the formula

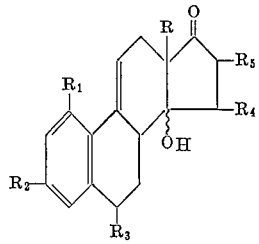

wherein R is a member selected from the group consisting of alkyl of 1 to 4 carbon atoms, phenyl and benzyl, each of $R_1$, $R_3$ and $R_5$ is a member selected from the group consisting of H and lower alkyl, $R_2$ is a member selected from the group consisting of H and alkoxy of 1 to 4 carbon atoms, and $R_4$ is a member selected from the group consisting of H and alkyl of 1 to 3 carbon atoms.

3. A compound as claimed in claim 2, wherein each of $R_1$, $R_4$ and $R_5$ is H.

4. A compound as claimed in claim 2, wherein each of $R_1$, $R_4$ and $R_5$ is H, and $R_2$ is lower alkoxy of 1 to 4 carbon atoms.

5. A compound as claimed in claim 2, wherein each of $R_1$, $R_3$, $R_4$ and $R_5$ is H, and $R_2$ is lower alkoxy of 1 to 4 carbon atoms.

6. 3 - methoxy - 14 - hydroxyestra-1,3,5(10),9-tetraen-17-one.

7. 3 - methoxy - 13 - ethyl-14-hydroxygona-1,3,5(10),9-tetraen-17-one.

8. 3 - methoxy - 13 - isopropyl-14-hydroxygona-1,3,5(10),9-tetraen-17-one.

9. 3-methoxy - 13 - phenyl-14-hydroxygona-1,3,5(10),9-tetraen-17-one.

10. 3 - methoxy-13-benzyl-14-hydroxygona-1,3,5(10),9-tetraen-17-one.

11. 3-methoxy - 6 - methyl-13-ethyl-14-hydroxygona-1,3,5(10),9-tetraen-17-one.

No references cited.

LEWIS GOTTS, *Primary Examiner.*

HARRY A. FRENCH, *Assistant Examiner.*